Patented Mar. 24, 1936

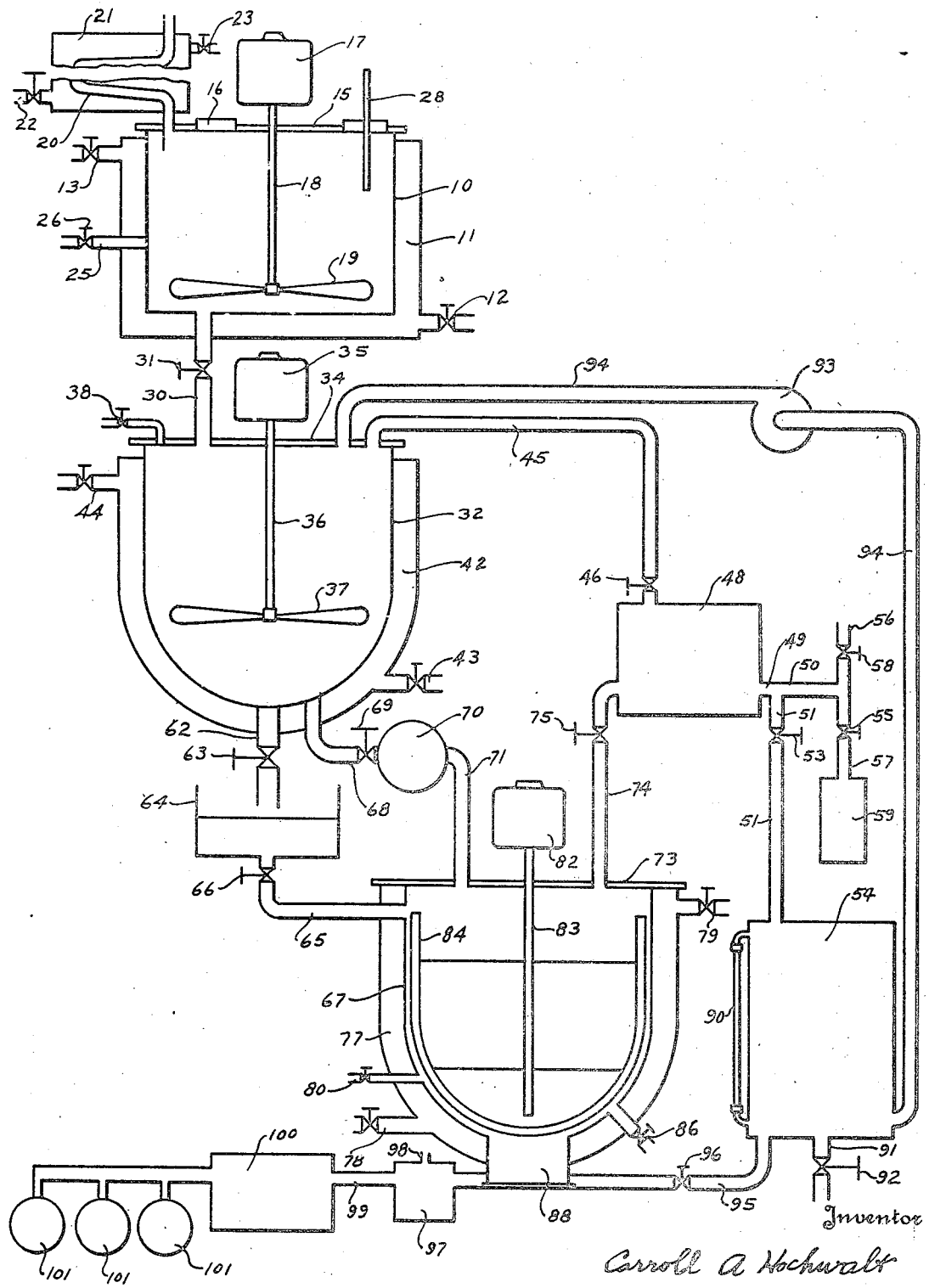

2,035,233

UNITED STATES PATENT OFFICE 2,035,233

PREPARED RESIN

Carroll A. Hochwalt, Dayton, Ohio, assignor, by mesne assignments, to Monsanto Petroleum Chemicals, Inc., Dayton, Ohio, a corporation of Delaware Application June 17, 1930, Serial No. 461,799

10 Claims. (Cl. 260—2)

This invention relates to the manufacture of artificial or prepared resins.

One of the principal objects of this invention is to provide such a prepared resin which has characteristics markedly superior in certain respects to the natural resins.

Another object of the invention is to provide a method for producing a prepared resin of this character, which is simple, easily carried out and controlled, economical in the consumption of chemicals, and produces a high grade resin of good color and hardness.

Still another object of the invention is to provide apparatus for carrying out the above method and producing the above product.

Other objects and advantages of the invention will be apparent from the following description when taken in connection with the accompanying drawing and appended claims.

The single view of the drawing is a diagrammatic representation of apparatus for practicing the method, and for producing the resin-like material of the present invention.

Reference is herein made to the copending application of Charles A. Thomas and Carroll A. Hochwalt, Serial No. 294,491, filed July 21, 1928, now Patent 1,836,629 which relates to the production of a synthetic resin of this general character.

In the practicing of this invention, unsaturated hydrocarbon compounds are utilized, as for example, unsaturated hydrocarbons found in cracked distillate, such as that obtained from natural gas. Distillate cracked according to the various methods now prevalent, contains a substantial proportion of unsaturated hydrocarbons. While a cracked distillate of relatively uncontrolled character can be employed, it is preferred to use a special fraction of the cracked distillate, which contains substantial proportions of both olefine and diolefine compounds, such as that fraction passing over between 30° C. and 40° C. While the unsaturated hydrocarbons employed may be readily obtained from cracked distillate of this character, such compounds obtained from other sources can of course be used.

It is to be understood that the term "unsaturated hydrocarbons" as used herein, refers to hydrocarbon compounds which unite with other compounds, such, for example, as the halogens, to form addition products without splitting off a new compound. Unsaturated hydrocarbons are capable of giving the Baeyer test for unsaturation. (Textbook of Organic Chemistry, Holleman, 6th ed. page 131.)

The unsaturated hydrocarbons are placed within a container or polymerizing vessel 10, which is in turn enclosed within a suitable water jacket 11 having valve controlled inlet and outlet connections 12 and 13 through which water may be flowed for controlling the temperature within the container. A cover 15 is fastened in a gas tight manner on the upper end of the vessel, and this cover is provided with a filling opening normally closed by a plug 16 through which material may be supplied to the interior. Cover 15 supports a motor 17, mounted in any suitable fashion, the shaft 18 of which projects downwardly into the vessel and carries a suitable stirrer or agitator 19 upon the lower end. Leading off from the top of chamber 10 is a reflux condenser coil 20 positioned within a suitable cooling jacket 21, to which cooling liquid may be introduced through the valve controlled outlet 23. The upper end of this condenser coil is open to atmosphere, as the purpose of it is to condense and return to the container 10 any vapors that may be generated during the reaction, thus preventing both the loss of the generated vapors and the undue building up of pressure during the reaction.

The unsaturated hydrocarbon compounds are fed into the container 10 through a pipe 25 controlled by a valve 26 leading from a suitable source of supply. A suitable catalyst or activating compound, such as pulverized anhydrous aluminum chloride ($Al_2Cl_6$), is added to the unsaturated hydrocarbons through the opening normally closed by plug 16. The aluminum chloride is preferably pulverized as this is found to improve the character of the resultant resin. This material is also added in small quantities at a time, while the contents of the container 10 are being agitated by the motor driven stirrer 19. For example, presuming that 25 gallons of cracked distillate of the fraction 30 to 40 are to be treated within the container 10, and aluminum chloride may be satisfactorily added in quantities of approximately six to eight ounces at a time. With the addition of the first batch of aluminum chloride, there is a rather active chemical reaction, such as a condensation or polymerization, with a resultant rise in temperature. It is desirable to control the temperature of the reaction so that the reacting mass does not become too highly heated. Satisfactory results are secured where the temperature is controlled below 65° C., this being readily accomplished by introducing the aluminum chloride in small amounts and by supplying cooling liquid to the cooling jacket 11. Additional batches of aluminum chloride are added from time to time as may be done without unduly increasing the temperature within container 10, and this is repeated with continuous agitation until no additional temperature rise results. The amount of aluminum chloride used will depend upon the proportion of condensable unsaturated hydrocarbons, and therefore it is a very satisfactory practice to add aluminum chloride until no further temperature rise is secured. Generally the addition of less than 3½ pounds of aluminum chloride for twenty-five gallons of the liquid undergoing polymerization is satisfactory.

In addition to aluminum chloride, other compounds which hydrolyze in water giving an acid reaction will function satisfactorily to cause the conversion of the unsaturated hydrocarbons into resins,—for example, chlorides of iron, boron, zinc, antimony, indium, titanium and tin; benzene sulfonic acid; propyl alcohol saturated with HCl gas; ethyl sulfate, and aniline hydrobromide. The polymerization is preferably carried out as rapidly as possible while preventing an objectionable temperature rise, as it is found desirable to not leave the catalyst in contact with the material for an objectionably long time. The reaction may proceed as much as twelve hours, but it is preferably completed in less time, such as four to six hours. A thermometer 28 may be mounted in the cover 15 to conveniently indicate the temperature of the reacting mass.

When the reaction within the container 10 is completed, the material is viscous and dark in color. This material is flowed from the polymerizing vessel through the outlet pipe 30 controlled by valve 31 into a neutralizing tank 32 containing a quantity of neutralizing agent. Tank 32 is provided with a tight fitting cover 34 which carries a motor 35 having a shaft 36 extending within the container and carrying at the lower end thereof suitable stirring blades 37. A valve controlled pipe 38 may be used to supply neutralizing liquid from a suitable reservoir to the tank 32. Various water soluble alkalies might be used for this neutralization, but preferably ammonium hydroxide is employed, as the excess of this material can subsequently be removed by distillation, and it has no injurious effects upon the resulting resin. On the other hand, alkali metal hydroxides such as sodium hydroxide, are more difficult to remove from the produced resin, and when allowed to remain in the resin form soaps with many of the pigments used in the paint industry and thus interfere with the satisfactory use of the resin with these pigments. A lighter colored product is also generally secured by the use of ammonia as a neutralizing agent.

The neutralizing treatment is also preferably carried out in the presence of a non-aqueous organic hydroxy compound which is effective to supply hydroxyl radicals for the decomposition and precipitation of the aluminum chloride or other activating agent present. An alcohol, such as ethyl alcohol, functions very satisfactorily for this purpose. Thus with the quantities specified above, a mixture of about 40% by volume of ammonium hydroxide (28% NH$_3$) and 60% by volume of 95% ethyl alcohol supplied to the neutralizing tank 32 by pipe 38 until approximately three gallons of the mixture have been introduced, gives very good results. The stirrer 37 is then started, and the polymerized reaction mass is introduced slowly from container 10 in a controlled stream by pipe 30 into the agitated neutralizing agent within the tank 32. The neutralization in the presence of an organic hydroxy compound of this character with proper agitation gives a granular precipitate of aluminum hydroxide which is readily removed by filtration. Otherwise a complex organic aluminum compound is apt to be formed which may remain in the resin giving objectionable results, particularly where the resin is used in varnishes and the like. Ammonia gas may be used, if desired, for the neutralization by leading the NH$_3$ gas into the reaction mass containing the hydroxy compound. Or an alcohol or other organic hydroxy compound may be first saturated with NH$_3$ gas, and then the ammonia saturated compound used for the neutralization. The term "ammonia" is used herein to refer to the NH$_3$, either in gaseous form or in solution.

The neutralization could be carried out in the presence of water, but this renders subsequent distillation more difficult, and is apt to result in quantities of water being occluded in the resin at this time. Other organic hydroxy liquids which are miscible with water, such as methyl alcohol, acetone etc., may be used for this purpose. The neutralization is accompanied by a color change, the polymerized product changing from a black or dark red to a yellowish red color, and thus indicating that the neutralization is complete and the mixture basic in character. The agitation and neutralizing action is generally completed in about half an hour. The ammonia neutralizes all of the aluminum chloride present, forming a flocculent precipitate of aluminum hydroxide. Some of the ammonium chloride formed in the reaction also precipitates in the organic solvents, and a portion of the resin reaction product may also precipitate. In order to insure that the resin is completely dissolved before filtration, an organic solvent which is immiscible in water, such as benzol, carbon tetrachloride, ethylene dichloride, and the like, is added to the neutralizing tank 32 prior to filtration. This organic solvent may be present during the neutralizing reaction, and may be initially added to the tank 32 along with the ammonia and the alcohol prior to the introduction of the polymerized reaction mass. Generally the addition of about three gallons of benzol is sufficient for this purpose.

Tank 32 is provided with a temperature control jacket 42 having valve controlled inlet and outlet connections 43 and 44 respectively, by means of which a heating medium such as steam or hot water may be supplied to the heating jacket. After the neutralizing reaction is completed, the contents of the tank 32 are preferably heated with steam by jacket 42 to a temperature of about 60° C. to insure that the produced resin is all dissolved. During this heating action, substantially all the excess ammonia is liberated and passes through the distillate offtake 45 having control valve 46 to a suitable condenser indicated diagrammatically at 48. This may be a conventional water cooled condenser, having condenser coils with which the pipe 45 communicates, and having an outlet 49 which communicates with branch pipes 50 and 51. Pipe 51 controlled by valve 53 communicates with a receiving tank or storage reservoir 54, whereas pipe 50 communicates with branches 55 and 56 respectively controlled by valves 57 and 58. Pipe 55 communicates with a vented receiving tank 59 containing water, so that the ammonia passing off from tank 32 at this time may be dissolved and recovered in tank 59. Pipe 56 communicates with atmosphere, so that gaseous products may be discharged directly to vent, if desired.

The contents of tank 32 are then preferably allowed to settle until stratification into a lower sludge layer, containing the precipitated aluminum hydroxide and ammonium chloride, and a supernatant liquid layer containing the alcohol and benzol and dissolved resin, results. This settling action may properly take place in three or four hours, but preferably the material is allowed to stand over night. The bottom layer of sludge is then withdrawn by the bottom discharge 62 controlled by valve 63 to a suitable filter 64, such as a cloth filter. The filter is connected by pipe 65 having a control valve 66 with a receiving or distillation tank 67. The precipitated aluminum hydroxide and ammonium chloride, are thus caught on the filter, whereas the filtrate is passed to the distillation vessel 67 through pipe 65. The filtered sludge is preferably treated to recover aluminum oxide (Al₂O₃) and ammonium chloride as by-products. The supernatant liquid, after the withdrawal of the sludge, is then passed by discharge pipe 68 having control valve 69 to a suitable centrifuge or other continuously operating filter 70 to remove any suspended undissolved materials therein, the filtrate passing by pipe 71 into distillation vessel 67.

Vessel 67 is provided with a tight fitting cover 73 carrying a distillate offtake pipe 74 controlled by valve 75 and communicating with the condenser coil in condenser 48, or with a separate condenser, if desired. A jacket 77, provided with valve controlled inlet and outlet 78 and 79 respectively for steam or hot water, is provided to exteriorly heat the liquid within vessel 67 to distill off the more volatile constituents, including the benzol and alcohol. During this distillation, the valves 57 and 58 are closed and valves 75 and 53 are opened, so that the distillate passes through pipe 74 to condenser 48 and the resulting condensate then flows by pipe 51 into receiving or storage tank 54. Distillation is continued until a thermometer in the distillate line rises to approximately 100° C., at which time substantially all of the alcohol and benzol, and any water, will have been driven off of the resulting resin, which is left in the vessel 67 as a semifluid or pasty mass.

The resin may then be purified to separate higher oils retained therein which tend to render the same soft or putty-like, if a hard resin is desired. This may be accomplished by the introduction of water or steam into the distillation vessel, and then by raising the temperature of the heating jacket 77 to a controlled higher temperature. The temperature is preferably not raised materially above 100° C. without water being present, as the color of the resultant resin may be darkened. Very satisfactory results are secured, after the initial exterior distillation, by the employment of a steam distillation. For this purpose, a valve controlled steam inlet 80 is provided, and the cover 73 carries a motor 82 on whose shaft 83 are mounted a plurality of stirring blades or arms 84, which are preferably shaped to conform to the interior wall of the container 67 and are positioned in close proximity thereto to effect a scraping action and prevent the resin from adhering to the wall. Each stirring arm 84 may be provided with a sharpened or pointed edge to facilitate this scraping action.

During this steam distillation, the knife stirrer is operated to agitate the resin and secure more intimate contact of the steam therewith, as well as to prevent the resin from adhering to the side of the vessel with possible overheating. This steam serves to remove and carry off any remaining benzol and higher oils present in the resin, which materials pass off by pipe 74. The condenser coil may be connected at this time to vent by pipe 56 for the removal of higher boiling gaseous constituents, while any benzol or water condensed in condenser 48 passes by pipe 51 into storage tank 54. The steam distillation may be continued for about three to six hours, and then the valve controlled water drain 86 opened to discharge any water condensed in the bottom of the vessel 67, such water also containing impurities dissolved out of the resin. The steam distillation is then stopped, and higher pressure steam supplied to jacket 77 to raise the temperature of the resultant mass, the agitation with the knife stirrer being continued. Preferably, the steam pressure in the jacket 77 is not permitted to rise above 25 to 30 pounds, and the temperature of the mass being treated is controlled below 130° C., generally between 110° C. and 120° C. This final heat treatment at higher temperatures and agitation may be continued for several hours, thereby removing remaining occluded water from the resin. The resin may be tested by dropping samples in boiling oil, and when spattering ceases this shows that the resin is properly dried. The resin is then removed from the distillation vessel 67, as by the bottom outlet 88, and placed in suitable collecting troughs or shallow pans where it is allowed to cool and harden. While any suitable form of feed from one vessel to another of the system may be provided, a gravity feed through the entire system, such as disclosed herein, is preferred for commercial installations.

The condensate accumulated in the storage vessel 54 consists primarily of a mixture of benzol and alcohol together with some water. This liquid on standing stratifies into a lower water layer and an upper benzol-alcohol layer. A sight glass 90 is preferably provided to indicate the level of liquid in the vessel and to show when stratification has taken place. A bottom outlet 91 controlled by valve 92 permits the lower water layer to be withdrawn, while the benzol-alcohol layer is conserved for further use. A portion of this benzol-alcohol mixture is supplied from time to time by pump 93 through pipe 94 to the neutralizing tank 32 for the treatment of fresh batches of polymerized product. Additional make-up alcohol together with ammonia, is added by valve controlled pipe 33 as needed for the treatment of each batch. In plant operation, the benzol-alcohol mix recovered in the reservoir 54 soon becomes of sufficient concentration in alcohol so that only ammonia need be added to tank 32 by pipe 33 for the treatment of fresh batches of polymerized product. Thus in plant operation, the only chemicals needed are aluminum chloride and ammonia, the benzol and alcohol being recovered and repeatedly used in the system.

When treating unsaturated hydrocarbons of controlled character, or special fractions of cracked distillate, a substantial quantity of unpolymerized hydrocarbons remain, these consisting mainly of the saturated hydrocarbons present in the original distillate. These hydrocarbons are eventually recovered by distillation and condensation and accumulated in the storage vessel 54 in the benzol-alcohol layer, so that an excess of this layer over that required for plant production is continually being produced. These hydrocarbons are preferably recovered as they are found useful for various purposes, such as for motor fuels. This is accomplished by withdrawing another portion of the accumulated condensate from storage tank 54 by pipe 95 controlled by valve 96, and introducing this portion into a separating tank 97 where an excess of water is added by pipe 98. The resultant mixed liquids on standing then settle out or stratify into two layers, an upper benzol layer containing the unacted upon hydrocarbons, and a lower water-alcohol layer. These layers are separated, such as by decantation, and are separately supplied by pipe 99 to a suitable still or stills 100 which may be of entirely conventional construction. The products are here fractionated to separately recover the alcohol and benzol and other desirable hydrocarbons, these being accumulated in a suitable collecting vessel indicated at 101. The alcohol thus recovered is preferably returned to the system, such as at the storage tank 54, to maintain the concentration of the alcohol in the benzol-alcohol mixture as described above.

The resin so prepared in accordance with this invention is found to have a yellow shading to dark amber color. When dissolved in a suitable oil solvent, such as naphtha, the resin forms a clear amber liquid, which when brushed onto a surface leaves a clear film which is practically colorless or has only a faint yellowish color. The prepared resin is non-acid in reaction and is unsaponifiable. Another very important and desirable characteristic of the prepared resin is that it does not retard the oxidizing action of linseed oil, so that a varnish can be prepared with this resin which compares favorably in speed of drying with lacquers.

While the method herein described and the apparatus for carrying out that method and the product so produced constitute preferred embodiments of our invention, it is to be understood that the invention is not limited to this precise method or apparatus, or precise product, and that changes may be made therein without departing from the scope of the invention which is defined in the appended claims.

What is claimed is:

1. The method of producing prepared resins, which comprises polymerizing unsaturated hydrocarbons with a metallic halide activating agent which hydrolyzes to give an acid reaction, and then neutralizing the reaction product with ammonia in the presence of an organic hydroxy compound which acts as a hydrolytic agent to decompose and precipitate the activating agent and an organic solvent for the reaction product, said solvent being immiscible with water.

2. The method of producing prepared resins, which comprises polymerizing unsaturated hydrocarbons with a metallic halide activating agent which hydrolyzes to give an acid reaction to produce a resinous reaction product, then neutralizing the reaction product with ammonia in the presence of an alcohol and also an added organic solvent for the resinous reaction product which is immiscible with water, filtering off the undissolved materials, and distilling the resultant filtrate to obtain a solid resin.

3. The method of producing prepared resins, which comprises agitating unsaturated hydrocarbons with a metallic halide activating agent which hydrolyzes to give an acid reaction, neutralizing the resulting resinous reaction product retaining oils having boiling points higher than the boiling points of the original unsaturated hydrocarbons, with an alkaline ammonium compound in the presence of an organic hydroxy compound which acts as a hydrolytic agent to decompose and precipitate the activating agent, adding prior to filtration an organic solvent for the resinous reaction product immiscible in water, then filtering the undissolved materials from the neutralized mass, distilling the filtrate to remove organic hydroxy compound, organic solvent and water from the resultant resin, and then introducing steam into the resin to remove retained oils having boiling points higher than the boiling points of the original unsaturated hydrocarbons, and to produce a hard resin.

4. In the production of prepared resins by condensation of unsaturated hydrocarbons in the presence of a metallic halide activating agent, followed by neutralization with alcoholic ammonia and removal of the neutralized activating agent, the method of purifying the resinous reaction product which comprises steam distilling the product at a temperature not substantially above 100° C., and then agitating and heating the resultant product at a temperature higher than 100° C. and below 180° C. to drive off occluded water.

5. The method of producing prepared resins, which comprises polymerizing unsaturated hydrocarbons with a metallic halide activating agent which hydrolyzes to give an acid reaction, to produce a resinous reaction product, and then neutralizing the reaction product with ammonia in the presence of acetone, to produce a neutralized resinous reaction product readily freed from alkali.

6. The method of producing prepared resins, which comprises polymerizing unsaturated hydrocarbons with a metallic halide activating agent which hydrolyzes to give an acid reaction to produce a resinous reaction product, then neutralizing the reaction product with ammonia in the presence of an organic water soluble hydrolytic compound to decompose and precipitate the activating agent to produce a neutralized resinous reaction product readily freed from alkali, said compound being selected from the similarly reacting group consisting of methyl alcohol, ethyl alcohol and acetone.

7. In the manufacture of unsaturated hydrocarbon resins by the polymerization of a cracked petroleum distillate fraction in the presence of a metallic halide activating agent which agent hydrolyzes in water to give an acid reaction, the step of neutralizing the polymerized reaction mixture containing the metallic halide activating agent by adding thereto a hydrolytic agent consisting of an ammoniacal water soluble alcohol.

8. In the manufacture of unsaturated hydrocarbon resins by the polymerization of a cracked petroleum distillate fraction in the presence of a metallic halide activating agent which agent hydrolyzes in water to give an acid reaction, the step of neutralizing the polymerized mixture by adding thereto a volatile water soluble alcohol having aqua ammonia dissolved therein.

9. In the manufacture of unsaturated hydrocarbon resins by the polymerization of a cracked liquid petroleum distillate fraction in the presence of a metallic halide polymerizing agent, which agent hydrolyzes in water to give an acid reaction, the step of neutralizing the polymerized liquid mixture containing the metallic halide polymerizing agent by adding to said reaction mixture an aqueous ammoniacal alcoholic solution.

10. In the polymerization of cracked petroleum distillates to produce resinous polymers wherein aluminum chloride is used as the polymerizing agent, the step in the recovery of the polymerized product, characterized in that the polymerized mixture is subjected to the action of aqueous alcoholic ammonia whereby complete neutralization and decomposition of the aluminum chloride, is effected before recovering the resinous polymers.

CARROLL A. HOCHWALT.